Sept. 9, 1941.  J. M. TYLER  2,255,717
FLEXIBLE CONNECTION
Filed March 21, 1939
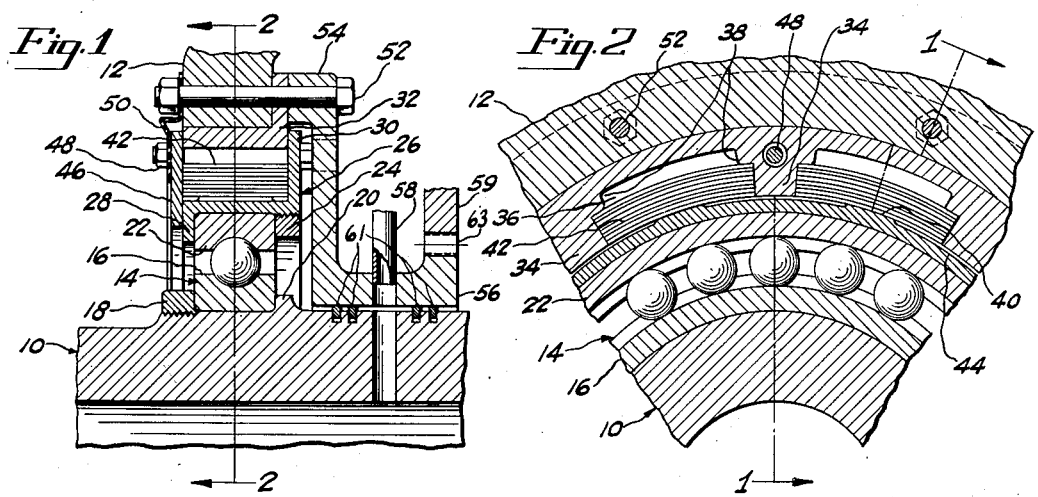
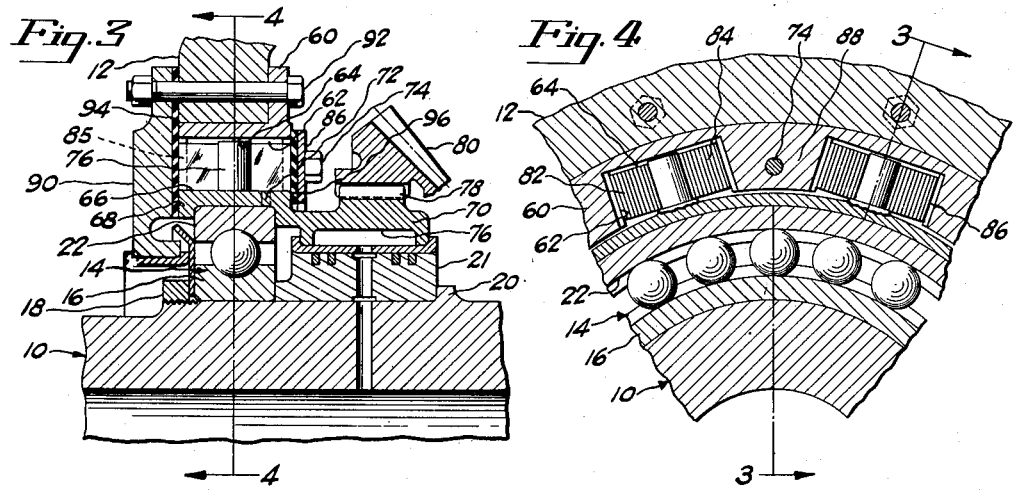
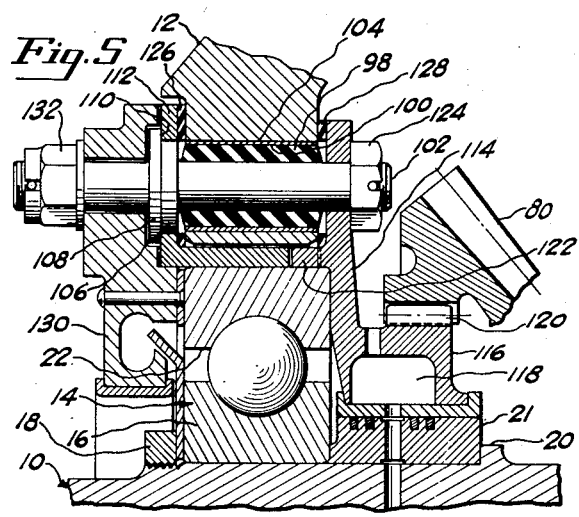
INVENTOR
John M. Tyler
BY Harris G. Luther
ATTORNEY Patented Sept. 9, 1941

2,255,717

UNITED STATES PATENT OFFICE 2,255,717

FLEXIBLE CONNECTION

John M. Tyler, West Hartford, Conn., assignor to United Aircraft Corporation, East Hartford, Conn., a corporation of Delaware Application March 21, 1939, Serial No. 263,177

11 Claims. (Cl. 74—303)

This invention relates to improvements in shaft bearing supports and has particular reference to an improved support for a rotatable drive shaft such as the propeller shaft of an aeronautical engine propeller combination.

An object of the invention resides in the provision of an improved bearing mounting arranged to provide a limited amount of resiliently and frictionally restricted freedom of movement of the drive shaft bearing in a plane perpendicular to the axis of rotation of the drive shaft.

A further object resides in the provision of an improved drive shaft mounting having a limited degree of frictionally damped flexibility so that the drive shaft may have a slightly eccentric or wobbling movement during rotation to relieve the shaft of some of the bending moments which would otherwise be imposed upon it during rotation.

Another object resides in the provision of a damped flexible support arranged to carry a torsionally loaded member of a reduction gear as well as the drive shaft to suppress the torsional vibrations of the engine crankshaft as well as the vibrations incident to unbalance of the rotating elements.

Other objects and advantages will be more particularly pointed out hereinafter or will become apparent as the description proceeds.

In the accompanying drawing, in which like reference numerals are used to designate similar parts throughout, there is illustrated, by way of example, three slightly modified forms of resilient bearing mountings constructed according to the invention. The drawing, however, is for the purpose of illustration only and is not to be taken as limiting or restricting the scope of the invention as set forth in the accompanying claims.

In the drawing, Fig. 1 is a vertical sectional view of a fragmentary portion of a drive shaft, drive shaft bearing and bearing support constructed according to the invention taken on the line 1—1 of Fig. 2.

Fig. 2 is a fragmentary transverse sectional view taken on the line 2—2 of Fig. 1.

Fig. 3 is a fragmentary sectional view similar to Fig. 1 showing a somewhat modified form of bearing mounting construction.

Fig. 4 is a fragmentary transverse sectional view similar to Fig. 2 taken on the line 4—4 of Fig. 3, and Fig. 5 is a fragmentary sectional view similar to Figs. 1 and 3 but showing a further modified form of bearing support constructed according to the invention.

Referring to the drawing in detail, the numeral 10 generally indicates a rotatable drive shaft such as the propeller carrying and driving shaft of an aeronautical engine propeller combination. This shaft may be integral with the engine crankshaft or may be a separate shaft connected to the engine crankshaft by a train of speed changing gears in a manner well known to the art. One end of the shaft 10 projects beyond the engine nosepiece 12 to receive the propeller (not illustrated) and is supported in the engine portion 12 by a suitable anti-friction bearing 14 arranged to carry both the radial loads and the axial loads due to the thrust developed by the propeller. The bearing 14 may be a ball bearing having an inner race 16 clamped to the shaft 10 by means of a screw threaded nut 18 which forces the inner race against a radial shoulder 20 or against the end of an oil collector ring 21 interposed between the race 16 and the shoulder 20, and an outer race 22 secured by suitable means to the nosepiece 12. In the form shown in Figs. 1 and 2 the outer race is clamped by a nut 24 in a supporting ring of Z shaped cross-section generally indicated at 26. One flange 28 of the ring 26 overlies the forward or outer face of the outer race 22 and cooperates with the nut 24 to retain the outer race in the ring, and the other flange 30 overlies at its periphery the inner face of an annular flanged bearing ring 32 which lines the aperture provided in the nosepiece 12 for the shaft 10. The ring 32 is provided on its inner face with spaced inwardly projecting radial extensions, as indicated at 34, which provide between them a plurality of annularly arranged spaced apart cavities 36 between the inner surface of the ring 32 and the outer surface of the cylindrical portion of the ring 26. Each cavity is provided with a pair of inwardly projecting shoulders, as indicated at 38, and the outer surface of the ring 26 is provided with spaced outward projections or pads, as indicated at 40, which are substantially centered on the center line of the respective cavities 36. A spring pack, as indicated at 42, is disposed in each cavity 36 and has on its opposite face sides an outer bearing at its ends on the shoulders 38 and an intermediate inner bearing on the corresponding pad 40 of the ring 26. Each spring pack comprises a number of comparatively thin superimposed leaf springs and may be preloaded to any desired extent by properly proportioning the shoulders 38 and pads 40. The inward radial extension 34 terminates somewhat short of the adjacent surface of the ring 26, as indicated at 44, to provide a space between the adjacent portion of the rings 26 and 32 to permit a limited amount of relative movement between these two rings, which movement is resiliently resisted by the spring packs 42. Since the ring 32 is fixed with respect to the nosepiece 12 and the ring 26 is fixed with respect to the outer race of the bearing 14 it is apparent that movement of the ring 26 with respect to the ring 32 provides a limited resiliently resisted movement of the bearing 14 with respect to the nosepiece or crankcase 12. The spring packs, particularly when preloaded as indicated above, not only resiliently resists movement of the bearing 14 with respect to the engine nosepiece or crankcase in a plane perpendicular to the axis of rotation of the shaft 10 but also damps these movements to avoid a building up of such movements by reason of resonance of drive shaft vibration with the resilient bearing supporting structure.

The inner ends of the spaces 36 are covered by the annular flange 30 of the ring 26, which flange transfers the thrust loads imposed on the bearing 14 to the ring 32, the annular flange of which overlies the portion of the nosepiece or crankcase adjacent to the drive shaft aperture to transfer these thrust loads to the engine. The forward ends of the spaces 36 are closed by a cover plate 46 in the form of an annular ring which is secured to the ring 26 by suitable means, such as the bolts or cap screws 48, which pass through enlarged apertures provided in the inwardly extending radial projections 34. Since the cover plate 46 is secured to the ring 26 and moves radially with respect to the ring 32 it has been found desirable to apply a flexible cover member 50 to the joint between the cover plate and the engine nosepiece 12. This flexible seal or cover member 50 is in the form of an annular ring or washer the inner edge of which is secured to the cover plate 46 by the bolts 48 and the outer edge of which is secured to the nosepiece or crankcase 12 by the spaced, circumferentially arranged, bolts 52 which extend through the engine portion 12, the flange of the ring 32 and the peripherial portion of a radial flange 54 provided on a bushing generally indicated at 56 arranged to transfer oil or hydraulic fluid under pressure from a relatively fixed conduit 58 to the interior of the rotating shaft 10 and provide an anchor for a torsionally loaded reaction element 59 of a speed changing drive gear. The bushing 56 has a relatively loose fit on the adjacent portion of the shaft 10 so that the shaft may move relative to the bushing, the oil seal being maintained by the floating rings 61. The member 59 may have a bearing on the shaft 10 in which case relative movement between the members 59 and 56 is taken through the splines 63.

In the form of the invention shown in Figs. 3 and 4 the ring 60 is provided with apertures 62 substantially the same as the cavities 36 of Fig. 2. The bearing retaining ring 66 is made in two circumferentially separated parts 68 and 70 having an interlocking crenelated juncture 72. The two parts are provided with opposed annular shoulders providing an annular recess for the outer race 22 and are secured together by bolts 74 which serve to clamp the bearing race in the recess. The portion 68 is provided with radially extending pins or spindles 76 which project into the apertures 62 and terminate short of the radially outer walls of the recesses 64 and the part 70 is provided with an annular extension which overlies the oil collector ring 21. The inner portion of this extension is recessed, as indicated at 76, to provide an annular oil containing space around the collector ring connected with an oil conduit, not illustrated. The outer portion of the extension is provided with a ring of splines 78 which receive the splined annulus of a gear element 80 which constitutes the torsionally loaded reaction element of a speed reducing drive gear. A pair of leaf spring packs, as indicated at 82 and 84 are disposed in each recess 62 with one spring pack disposed upon each side of the corresponding radial pin 76. Each spring pack is arranged with the constituent leaf spring elements substantially parallel to the axis of the shaft 10 and has its ends supported upon shoulders in the corresponding side wall of the recess as indicated at 85 so that each pin 76 may move sideways to a limited extent along the face of the spring in the recess in which it is received. With this arrangement the shaft 10 may have a slight movement in radial directions resisted by the frictionally damped resiliency of the spring packs. Vertical movements of the shaft would be resisted by the spring pack against the pins located on or near the horizontal diameter and horizontal movements would be resisted by the corresponding spring packs bearing against the pins located on or near the vertical diameter, the movements of the shaft in any direction being resisted by the spring pack disposed on or near a diameter at 90 degrees to the direction of movement. The indicated freedom of movement is provided by the depressions 64 into which the pins and associated spring packs which are located in or near the direction of movement, may project when the ring 66 moves with the shaft. The spring packs also provide a resiliently resisted freedom of movement for the gear 80 since the ring 66 may move slightly in a rotational direction against the resistance of all of the spring packs located on the side of the respective pin 76 in the direction of the rotational movement. This provides a friction damped resiliently resisted anchor for the gear element 80 so that this gear element may move slightly in a rotational direction to absorb and suppress the torsional vibration of the engine crankshaft. The inner sides of the spaced apertures 62 are closed by an annular cover plate 86 held in place by the bolt 74 threaded into the extension 88 of ring 60 lying between the recesses 62, and the outer sides of the depressions are closed by a thrust plate 90 secured to the bearing surrounding portion of the engine nosepiece 12 by the through bolts 92 which also extend through and support the annular ring 60. Preferably suitable gaskets 94 and 96 are disposed between the thrust plate 90 and the cover plate 86 respectively and the adjacent surfaces of the rings 60 and 66 and the engine nosepiece.

In the form of the invention shown in Fig. 5 the bearing surrounding portion of the engine nose-piece 12 is made somewhat thicker and stronger than the corresponding portion in the arrangement shown in Figs. 1 to 4, inclusive, and is provided near the bearing receiving aperture with a series of spaced apertures 98 each of which receives a resilient bushing 100 bonded onto the shank of a through bolt 102. Each resilient bushing 100 preferably comprises a bushing of rubber or similar resilient material bonded to the shank of the bolt 102 and to the inner surface of an outer sleeve 104 which fits tightly in the corresponding aperture 98. Each bolt 102 is screw threaded at each end and is provided intermediate its length with a pair of adjacent annular enlargements 106 and 108. These enlargements are located immediately at the corresponding ends of the resilient bushing 100 and the enlargement 108 remote from the end of the bushing is somewhat larger than the adjacent enlargement 106 to provide an annular shoulder 110 facing the bushing. A ring member 112 is provided in one portion thereof with spaced apertures which receive the enlargements 106 of the respective bolts 102 and has an axially extending cylindrical portion overlying and supporting the outer race 22 of the outboard engine bearing 14. A second annular member 114 is provided with spaced apertures which receive the inner ends of the corresponding bolts 102 and with an axially extending cylindrical portion 116 which overlies the outer surface of the oil collector ring 21. This cylindrical portion 116 is provided in its inner surface with an annular oil receiving groove 118 and on its outer surface with a ring of splines or detents 120 which receive a splined annulus on the reduction gear reaction elements 80. The annular member 114 is also provided with a crenelated annular portion 122 which intermeshes with corresponding crenelations provided on the inner end of the cylindrical portion of the ring member 112 to interlock the members 112 and 114 against relative rotation. A nut 124 screw threaded onto the inner end of each bolt 102 secures the members 112 and 114 together. Preferably resilient gaskets as indicated at 126 and 128 are disposed between the members 112 and 114, respectively, and the adjacent side of the nosepiece 12. The bearing 14 is held in the ring 112 by a thrust plate 130 which is provided with apertures receiving the outer ends of the bolts 102, each aperture being surrounded at the inner face of the pressure plate by a circular recess to receive the enlargement 108 of the corresponding bolt. Nuts as indicated at 132 screw threaded upon the outer end of each bolt 102 secure the thrust plate in position upon the nosepiece 12, the thrust plate reaction being transferred through the bolts 102 to the annular member 114 and by this member to the inner side of the engine nosepiece.

With this arrangement the shaft 10 has a limited freedom of radial movement by compression of the material of the resilient bushing 100 in a direction radially of the bearing 14 while the reaction element 80 has a limited freedom of rotational movement by compression of the material of the resilient bushings 100 in a direction circumferentially of the circle including the axes of the spaced apertures 98. Thus the shaft may move slightly about its theoretical axis of rotation to accommodate itself, without undue strain, to a slightly out of balance condition of a rotating shaft carried body such as a propeller and the reaction element 80 may move slightly in a rotational direction to absorb and suppress the torsional vibration occurring in the rotation of the engine crankshaft.

One important advantage of the improved construction above described is that when used to support the bearing of a propeller carrying shaft the resilient bearing support permits the propeller when rotating above critical speed to rotate substantially about its center of mass without imposing heavy bending stresses on the shaft, the shaft being permitted a sufficient amount of relatively free wobble to follow the geometrical center of the propeller about the rotational center without undue stresses being imposed thereon.

Another very important advantage of the improved construction is that the friction damping effect of the resilient element brings the natural frequency of the rotating system to such a low rate that rotationally induced vibrations do not get into resonance with the frequency of the rotating system at any propeller speed high enough to produce seriously objectionable results that is, the critical speed of the propeller is kept out of the normaly useful range of propeller speed. A third advantage resides in the provision of a single resilient mounting which controls the critical speed of the rotating system and also suppresses the torsional vibration at the driving shaft. While three particularly important advantages has been described this description is not intended to in any way limit the utility of the improved construction as many other material advantages will occur to those skilled in the art upon an inspection of the disclosure.

While three somewhat different mechanical embodiments have been hereinabove described and illustrated in the accompanying drawing for the purpose of disclosing the invention, it is to be understood that the invention is in no way limited to the particular construction and arrangements so illustrated and described, but that such changes in the size, shape and arrangement of the various parts may be resorted to as come within the scope of the subjoined claims.

Having now described the invention so that others skilled in the art may clearly understand the same, what it is desired to secure by Letters Patent is as follows:

1. In an engine having a drive shaft and a casing provided with an aperture through which said drive shaft projects, an anti-friction bearing surrounding said drive shaft within said aperture, said anti-friction bearing being subject to loads both radially and axially of said drive shaft, resilient means for transmitting said radial loads to said casing, and means movable with respect to said casing for transmitting said axial loads thereto.

2. In an engine having a drive shaft and a casing provided with an aperture through which said drive shaft projects, an anti-friction bearing surrounding said drive shaft within said aperture, a ring attached to said bearing, a ring larger than said bearing attached ring attached to said casing, means between said rings for resiliently maintaining them in concentric spaced relation with respect to each other, and means for maintaining said rings against substantial relative movement along the axis of said drive shaft.

3. In an engine having a drive shaft and a casing provided with an aperture through which said drive shaft projects, an anti-friction bearing surrounding said drive shaft within said aperture, a ring attached to said bearing, a ring larger than said bearing attached ring attached to said casing within said aperture, and means for resiliently maintaining said rings in concentric spaced relation to each other comprising, a plurality of spaced apart circumferentially arranged resilient spring packs disposed between said rings.

4. In an engine having a drive shaft and a casing provided with an aperture through which said drive shaft projects, an anti-friction bearing surrounding said drive shaft within said aperture, a ring attached to said bearing, a ring larger than said bearing attached ring attached to said casing, and means between said rings for resiliently maintaining them in concentric spaced relation with respect to each other said means comprising a plurality of spaced apart circumferentially arranged spring packs disposed between said rings, each spring pack having end bearings on one ring and an intermediate bearing on the other.

5. In an engine having a drive shaft and a casing provided with an aperture through which said drive shaft projects, an anti-friction bearing surrounding said drive shaft within said aperture, a resilient support between said bearing and said casing comprising, a ring receiving said bearing, a thrust plate retaining said bearing in said ring, and resilient means securing said ring and said thrust plate to said casing.

6. In an engine having a drive shaft and a casing provided with an aperture through which said drive shaft projects, and a torque reaction element of a gear train within said casing, an anti-friction bearing surrounding said drive shaft within said aperture, a ring in said aperture receiving the outer portion of said bearing and providing an anchor for said torque reaction element, means restraining said ring against movement through said aperture, and means providing a limited freedom of damped resiliently resisted movement of said ring radially of said aperture and rotationally therein comprising a plurality of spring packs spaced about said ring between said ring and said casing.

7. In an engine having a drive shaft and a casing provided with an aperture through which said drive shaft projects, an anti-friction bearing surrounding said drive shaft within said aperture, and a resilient support between said bearing and said casing comprising, a ring receiving said bearing and overlapping said casing around said aperture, a thrust plate overlapping said casing and said ring, clamp bolts extending through registering apertures in the overlapping portions of said ring, said casing and said thrust plate, and bushings of resilient material surrounding the portions of said bolts in said casing apertures.

8. In an engine having a drive shaft and a casing provided with an aperture through which said drive shaft projects, an anti-friction bearing surrounding said drive shaft within said aperture, and a resilient support between said bearing and said casing comprising, an inner ring attached to said bearing, an outer ring larger than said inner ring attached to said casing within said aperture and provided with a plurality of angularly spaced circumferentially arranged cavities facing said inner ring, resilient elements in said cavities, and extensions on said inner ring projecting into said cavities and bearing against the face of said resilient elements.

9. In an engine having a drive shaft and a casing provided with an aperture through which said drive shaft projects, an anti-friction bearing surrounding said drive shaft within said aperture, and a resilient support between said bearing and said casing comprising, an inner ring attached to said bearing, an outer ring larger than said inner ring attached to said casing within said aperture and provided with angularly spaced circumferentially arranged cavities facing said inner ring, end shoulders in each of said cavities, a spring pack in each cavity supported at its ends on the corresponding end shoulders, and radial extensions on said inner ring projecting into said cavities and bearing against the intermediate face portions of respective spring packs.

10. In an engine having a drive shaft and a casing provided with an aperture through which said drive shaft projects, an anti-friction bearing surrounding said drive shaft within said aperture, and a torque reaction element of a planetary gear train, a ring receiving said bearing and providing an anchor for said torque reaction element and having a portion overlapping said casing around said aperture, a thrust plate for said bearing overlapping said casing around said aperture, bolts extending through registering apertures in said ring said thrust plate and said casing, and rubber bushings on said bolts fitted into the apertures in said casing.

11. In combination with an engine connected to a propeller shaft through means including a stationary torque reaction element, a casing through which the propeller shaft projects, a bearing for supporting said shaft in said casing, damped resilient elements resiliently supporting said bearing in said casing and resiliently connecting said torque reaction element with said casing.

JOHN M. TYLER.